United States Patent
Boyle

(10) Patent No.: US 9,448,919 B1
(45) Date of Patent: Sep. 20, 2016

(54) DATA STORAGE DEVICE ACCESSING GARBAGE COLLECTED MEMORY SEGMENTS

(71) Applicant: Western Digital Technologies, Inc., Irvine, CA (US)

(72) Inventor: William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 202 days.

(21) Appl. No.: 13/675,211

(22) Filed: Nov. 13, 2012

(51) Int. Cl.
*G06F 12/02* (2006.01)
*G06F 3/06* (2006.01)

(52) U.S. Cl.
CPC ............... *G06F 12/02* (2013.01); *G06F 3/065* (2013.01)

(58) Field of Classification Search
None
See application file for complete search history.

(56) References Cited

U.S. PATENT DOCUMENTS

| | | | |
|---|---|---|---|
| 6,061,194 A | 5/2000 | Bailey | |
| 7,599,261 B2 | 10/2009 | Achanta et al. | |
| 7,752,381 B2 * | 7/2010 | Wong | 711/103 |
| 7,783,851 B2 | 8/2010 | Im et al. | |
| 7,916,421 B1 | 3/2011 | Liikanen et al. | |
| 8,194,340 B1 | 6/2012 | Boyle et al. | |
| 8,677,203 B1 * | 3/2014 | Shalvi et al. | 714/747 |
| 2008/0282024 A1 * | 11/2008 | Biswas et al. | 711/103 |
| 2010/0037001 A1 * | 2/2010 | Langlois et al. | 711/103 |
| 2014/0047161 A1 * | 2/2014 | Nemazie | G06F 12/0246 711/103 |

OTHER PUBLICATIONS

Burkhard et al., "Rotational Position Optimization (RPO) Disk Scheduling", Jul. 2001.*

* cited by examiner

*Primary Examiner* — Brian Peugh
*Assistant Examiner* — Tracy Chan

(57) ABSTRACT

A data storage device is disclosed comprising a non-volatile memory comprising a plurality of memory segments. A first write command is received from a host comprising first data and a first logical block address (LBA). The first data is written to a first memory segment and the first LBA is first mapped to a first physical block address (PBA) of the first memory segment. During a garbage collection operation, the first data is copied from the first memory segment to a second memory segment and the first LBA is second mapped to a second PBA of the second memory segment. After the garbage collection operation, a read command is received from the host comprising the first LBA. A selection is made between the first and second memory segments, and at least part of the first data is read from the selected memory segment.

22 Claims, 8 Drawing Sheets

PRIMARY
LBA MAPPING TABLE

| LBA | PBA_1 |
|---|---|
| 1004564 | 2285642 |
| 1004565 | 2285643 |
| 1004566 | 2285644 |
| : | : |

GARBAGE COLLECTION
LBA MAPPING TABLE

| LBA | PBA_2 |
|---|---|
| 1004564 | 1049832 |
| 1004565 | 1049833 |
| : | : |

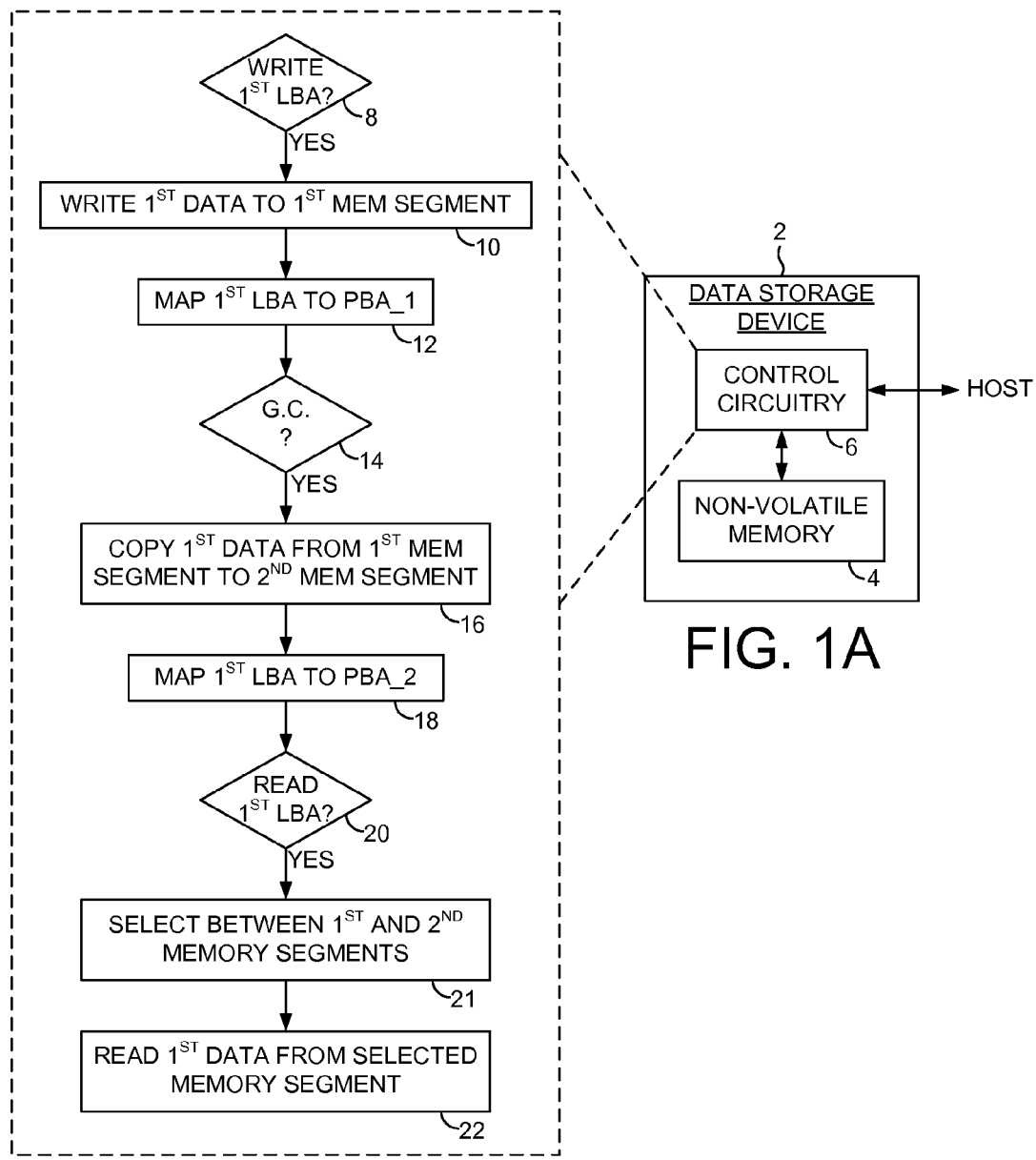
FIG. 1A
FIG. 1B
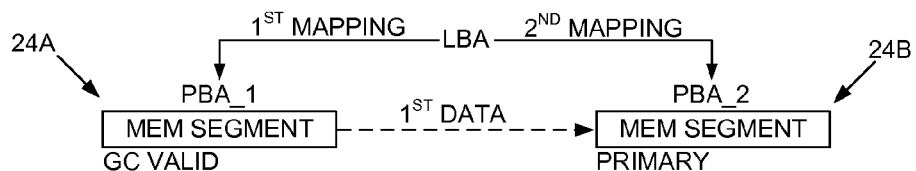
FIG. 1C

LBA MAPPING TABLE
| LBA | PBA_1 | PBA_2 |
|---|---|---|
| 1004564 | 2285642 | 1049832 |
| 1004565 | 2285643 | 1049833 |
| 1004566 | 2285644 | NULL |
| : | : | : |
FIG. 5A
PRIMARY
LBA MAPPING TABLE
| LBA | PBA_1 |
|---|---|
| 1004564 | 2285642 |
| 1004565 | 2285643 |
| 1004566 | 2285644 |
| : | : |
GARBAGE COLLECTION
LBA MAPPING TABLE
| LBA | PBA_2 |
|---|---|
| 1004564 | 1049832 |
| 1004565 | 1049833 |
| : | : |
| : | : |
FIG. 5B
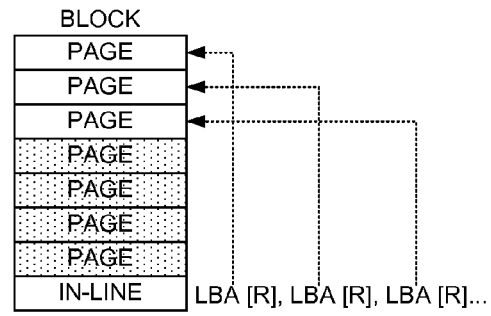
FIG. 6A
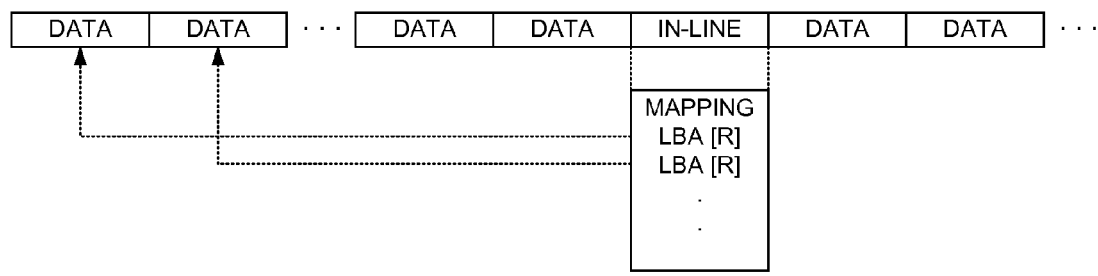
FIG. 6B

DATA STORAGE DEVICE ACCESSING GARBAGE COLLECTED MEMORY SEGMENTS

BACKGROUND

Data storage devices (e.g., disk drives or non-volatile semiconductor memories) may be employed as mass storage for a computer system (e.g., desktop, laptop, portable, etc.) or a consumer device (e.g., music player, cell phone, camera, etc.) or other suitable application. The data storage device includes a non-volatile memory (e.g., a disk or a semiconductor memory) for storing user data in memory segments which are accessed using an address translation layer. For example, the address translation layer may map a logical block address (LBA) received from a host to a physical block address (PBA) representing a memory segment of the non-volatile memory. The indirect mapping of LBA to PBA facilitates aspects such as defect mapping, and log-structured file systems where the LBA to PBA mapping may change over time.

An example data storage device employing an address translation layer is a non-volatile semiconductor memory comprising one or more memory devices (such as a flash memory). Each memory device typically comprises a number of blocks which are accessed a page at a time. For example, a single block may comprise 128 pages where each page comprises 4096 bytes. Since a page typically cannot be overwritten without first being erased, a new page in a different block is typically selected to perform an "overwrite" operation. Accordingly, the address translation layer must maintain the appropriate LBA to PBA mapping as each write operation changes the physical location of the user data (similar to a log-structured file system). When the same LBA is written by the host, the data is written to a new PBA and the old PBA is marked invalid so that it may be reused (erased and overwritten with new data).

A similar dynamic LBA to PBA mapping may be employed in a disk drive, wherein the memory segments comprise data sectors of data tracks which may or may not be erased before being overwritten. The process of copying data from valid memory segments to new memory segments and reallocating the invalid memory segments is referred to as garbage collection.

BRIEF DESCRIPTION OF THE DRAWINGS

FIG. 1A shows a data storage device according to an embodiment of the present invention comprising a non-volatile memory comprising a plurality of memory segments.

FIG. 1B is a flow diagram wherein first data may be read from a garbage collected memory segment instead of a primary memory segment according to an embodiment of the present invention.

FIG. 1C illustrates an embodiment of the present invention wherein a first LBA is first mapped to a first PBA of a first memory segment, and second mapped to a second PBA of a second memory segment after executing a garbage collection operation according to an embodiment of the present invention.

FIG. 5A shows an LBA mapping table for storing a primary mapping and a secondary mapping corresponding to a valid garbage collection memory segment according to an embodiment of the present invention.

FIG. 5B shows an embodiment of the present invention wherein a primary LBA mapping table stores the primary mapping and a garbage collection LBA mapping table stores the secondary mapping.

FIG. 6A shows an embodiment of the present invention wherein in-line mapping information is stored in a memory segment (page) of a block in a non-volatile semiconductor memory.

FIG. 6B shows an embodiment of the present invention wherein in-line mapping information is stored in a memory segment (data sector) of a disk in a disk drive.

DETAILED DESCRIPTION

Figure 2A:
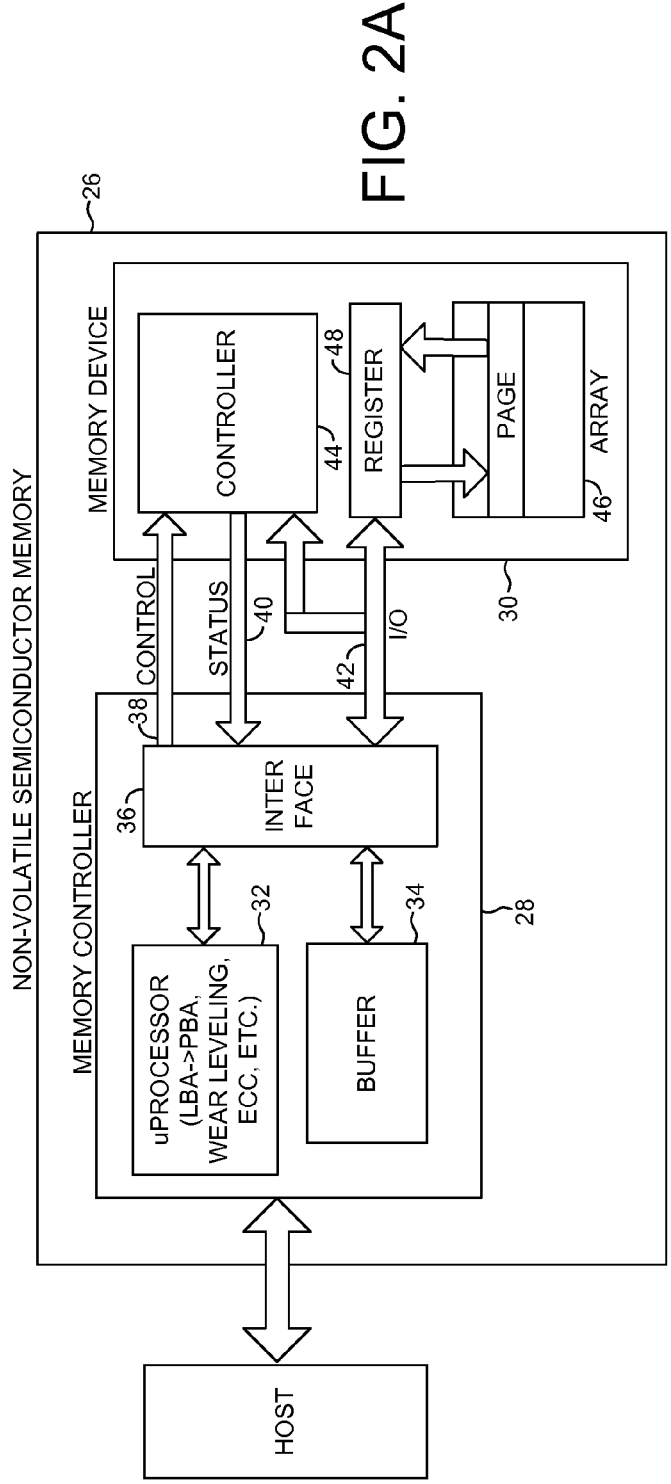
FIG. 2A shows an embodiment of the present invention wherein the data storage device comprises a non-volatile semiconductor memory.

FIG. 1A shows a data storage device 2 according to an embodiment of the present invention comprising a non-volatile memory 4 comprising a plurality of memory segments. The data storage device 2 further comprises control circuitry 6 operable to execute the flow diagram of FIG. 1B, wherein a first write command is received from a host (block 8) comprising first data and a first logical block address (LBA). The first data is written to a first memory segment (block 10) and the first LBA is first mapped to a first physical block address (PBA) of the first memory segment (block 12). During a garbage collection operation (block 14), the first data is copied from the first memory segment to a second memory segment (block 16) and the first LBA is second mapped to a second PBA of the second memory segment (block 18). After the garbage collection operation, a read command is received from the host comprising the first LBA (block 20). In response to the read command, a selection is made between the first memory segment and the second memory segment (block 21), and at least part of the first data is read from the selected memory segment (block 22).

FIG. 1C illustrates an embodiment of the present invention wherein data is first written to a first memory segment 24A when servicing a write command from a host. An LBA of the write command is mapped to the PBA of the first memory segment 24A. The first memory segment 24A is part of a block of memory segments that may comprise other invalid memory segments, and is therefore eventually garbage collected in order to free the invalid memory segments for future write commands. During the garbage collection operation, the data stored in the first memory segment 24A may still be valid and is therefore copied to a second memory segment 24B with the LBA mapped to the PBA of the second memory segment 24B. However, in one embodiment the data stored in first memory segment 24A remains valid after the copy operation (i.e., the first memory segment 24A is not immediately erased). Therefore in one embodiment the first mapping of the LBA to the first memory segment 24A is retained in order to retain a copy of the data. The copy of the data may be used for any suitable reason, such as for error recovery when the second memory segment 24B is unrecoverable, or to increase throughput of the data storage device.

FIG. 2A shows a data storage device in the form of a non-volatile semiconductor memory-based storage device 26 comprising a memory controller 28 (e.g., a flash memory controller) and a memory device 30 (e.g., a flash memory) according to one embodiment. While the description herein refers to non-volatile semiconductor memory generally, it is understood that non-volatile semiconductor memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In one embodiment, the memory controller 28 comprises a microprocessor 32 for implementing various algorithms, including LBA to PBA mapping, wear leveling, error correction code (etc.). The memory controller 28 further comprises a buffer 34 for buffering write/read data, and interface circuitry 36 for interfacing with one or more memory devices 30. The interface circuitry 36 generates suitable control signals 38 and receives status information 40 from the memory device(s) 30 in connection with executing write/read commands initiated by the microprocessor 32. The interface circuitry 36 also transmits and receives data over an I/O bus 42, including write/read data stored in the buffer 34 or command data generated by the microprocessor 32 and transmitted to a controller 44 integrated with the memory device(s) 30.

In one embodiment, the memory device(s) 30 comprises an array of memory cells 46 that are accessed in memory segments referred to as pages. During a write operation, write data received over the I/O bus 42 from the buffer 34 is first stored in a data register 48. The controller 44 then transfers the write data from the data register 48 to a target page in the memory array 46. During a read operation, a page in the memory array 46 is read into the data register 48 and then transferred over the I/O bus 42 where it is stored in the buffer 34. In one embodiment, the memory array 46 comprises a plurality of blocks, each block comprises a plurality of pages, and the pages in a block are erased together by erasing the block.

Figure 2B:
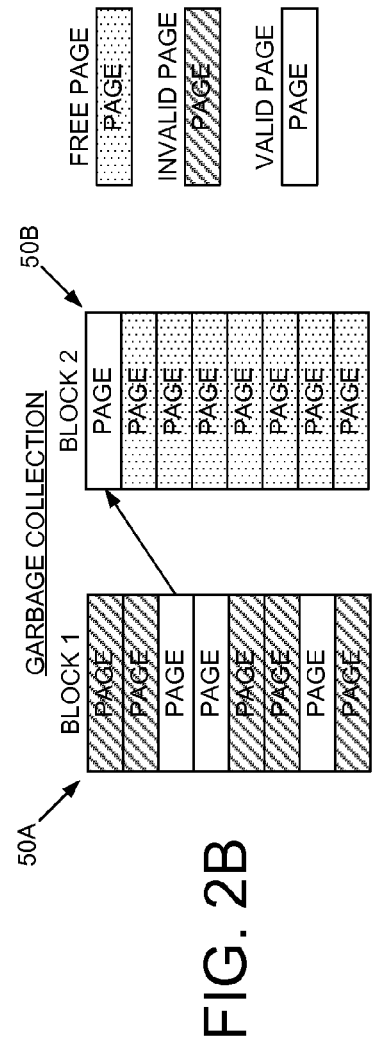
FIG. 2B illustrates a garbage collection operation wherein data from a valid page of a first block is copied to a second block so that the first block may eventually be erased and overwritten according to an embodiment of the present invention.

When an LBA is written, the data is written to a free page of the current block allocated to servicing write commands. When the current block is filled with data, a new block is selected from a pool of free blocks, and the newly selected block is used to service the write commands. When an LBA is overwritten, the new data is written to a free page of the current block, and the old data stored in the page of the old block is marked as invalid. FIG. 2B illustrates a first block 50A storing invalid pages and valid pages. During a garbage collection operation, the valid pages in the first block 50A are copied to free pages of a second block 50B. Conventionally, once this copying is completed, the valid pages in the first block 50A would be marked invalid and subject to erasure. However, since the data in the first block 50A is a copy of the valid data in the second block 50B, embodiments of the present invention maintain mapping data that reference those pages in the first block 50A and exploit the redundancy rather than immediately erasing the pages in the first block 50A.

In one embodiment, the garbage collection operation for the non-volatile semiconductor memory-based storage device 26 shown in FIG. 2A is divided into two stages. During a first stage, the valid pages of old blocks are copied to new blocks without erasing the old blocks. The first and second mapping to the old and new blocks is maintained so that the resulting redundancy can be exploited. In a second stage, when the number of free blocks falls below a threshold or when other factors such as wear leveling trigger erasure of blocks, a number of the old blocks storing the redundant copies of data are erased and placed in the pool of free blocks. When a page of an old block storing redundant data is erased, the corresponding LBA mapping information is also invalidated. Accordingly in this embodiment, the pages of old blocks storing redundant copies of data may be accessed during the interval between the first and second stages of the garbage collection operation, or until the LBA is overwritten as part of a new write command in which case the LBA mapping information to the page in the old block is also invalidated. Although the embodiments are described as operating on a page level, in some embodiments, valid/invalid data may be operated upon and/or mapped at a sector level or a different unit of granularity. For example, the same principles would be applicable in implementations where a page may include multiple sectors or other units of granularity.

Figures 3A, 3B:
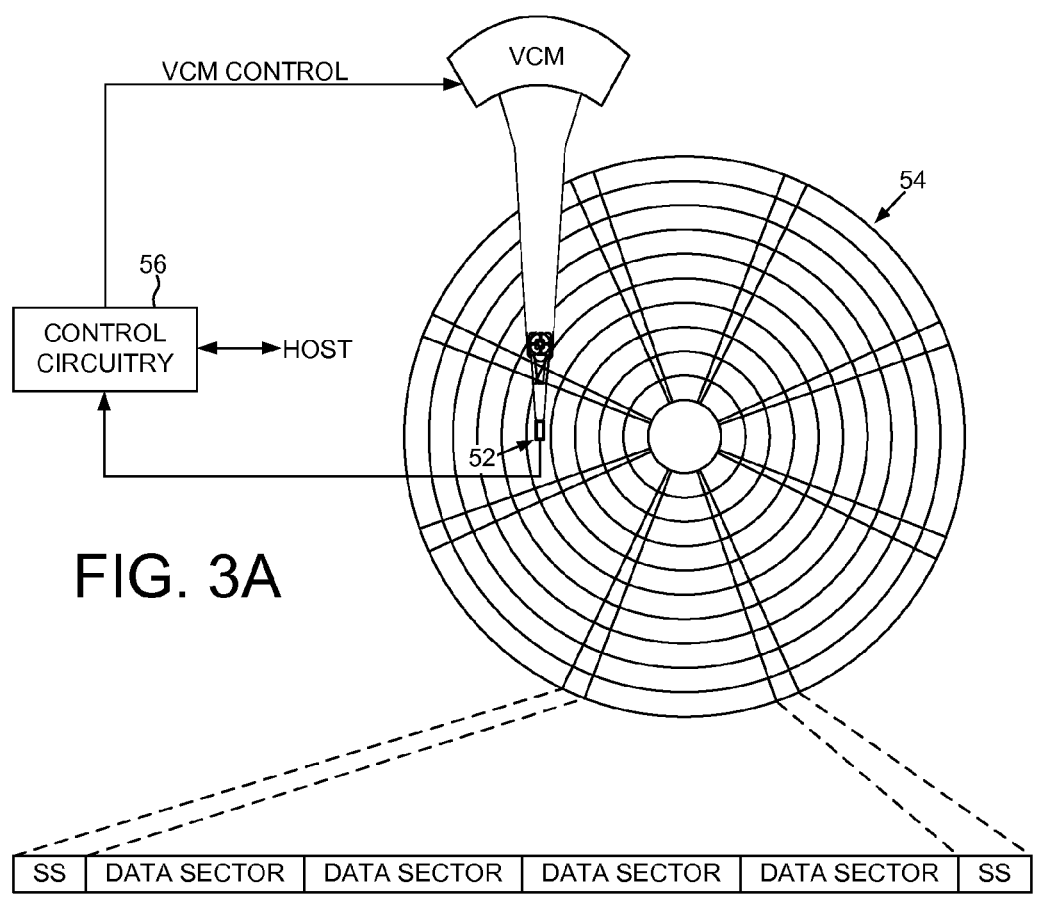
FIG. 3A shows an embodiment of the present invention wherein the data storage device comprises a disk drive.
FIG. 3B shows an embodiment of the present invention wherein the memory segments comprise data sectors of a data track.

FIG. 3A shows a data storage device in the form of a disk drive comprising a head 52 actuated over a disk 54 by a voice coil motor (VCM). The disk drive further comprises control circuitry 56 for implementing the embodiments of the present invention, including to maintain first and second mappings for garbage collected LBAs. The disk comprises a plurality of data tracks, wherein in an example shown in FIG. 3B each data track comprises a plurality of data sectors for storing user data and embedded servo sectors (SS) for storing servo positioning information (e.g., track address and servo bursts). In one embodiment, each memory segment corresponds to a data sector accessed through a PBA.

Similar to a flash based memory device described above, the disk drive of FIG. 3A may implement a dynamic LBA to PBA mapping, for example, when implementing a log-structured file system. With a log-structured file system, data is typically written to a new memory segment (data sector) during each write operation (including overwrite operations). The old memory segments (data sectors) are invalidated and then reallocated using a garbage collection algorithm. A disk drive may implement a log-structured file system, for example, when implementing a shingled track system where write operations progress in the same radial direction so that the data tracks can overlap, thereby increasing the tracks per inch (TPI).

Figure 4A:
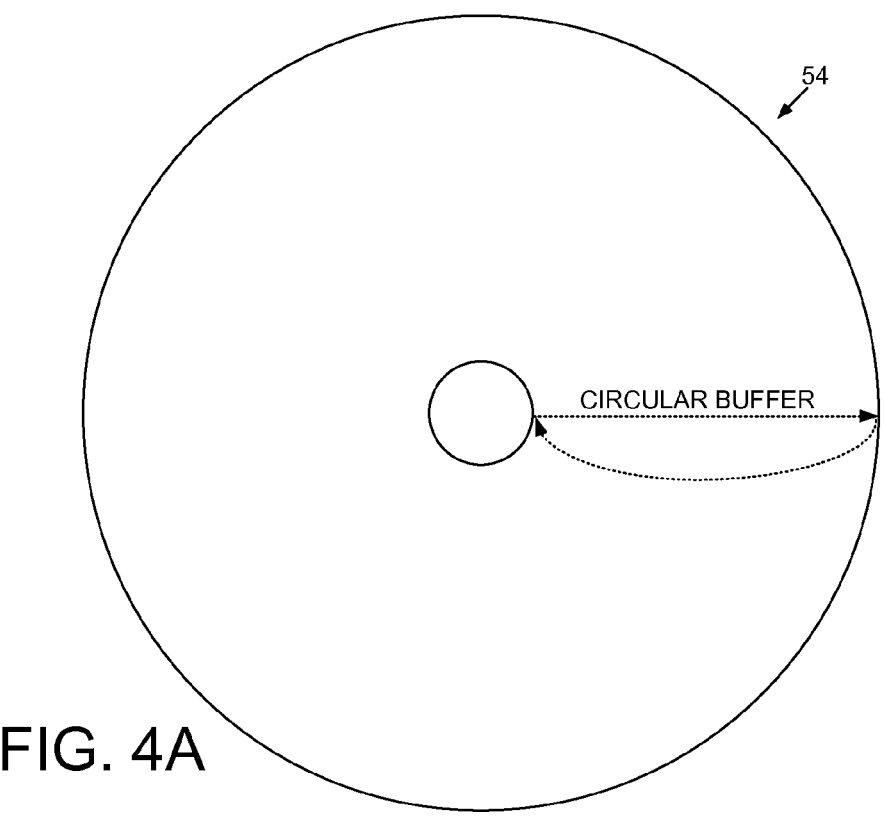
FIG. 4A shows an embodiment of the present invention wherein the disk of a disk drive is accessed as a circular buffer.
Figure 4B:
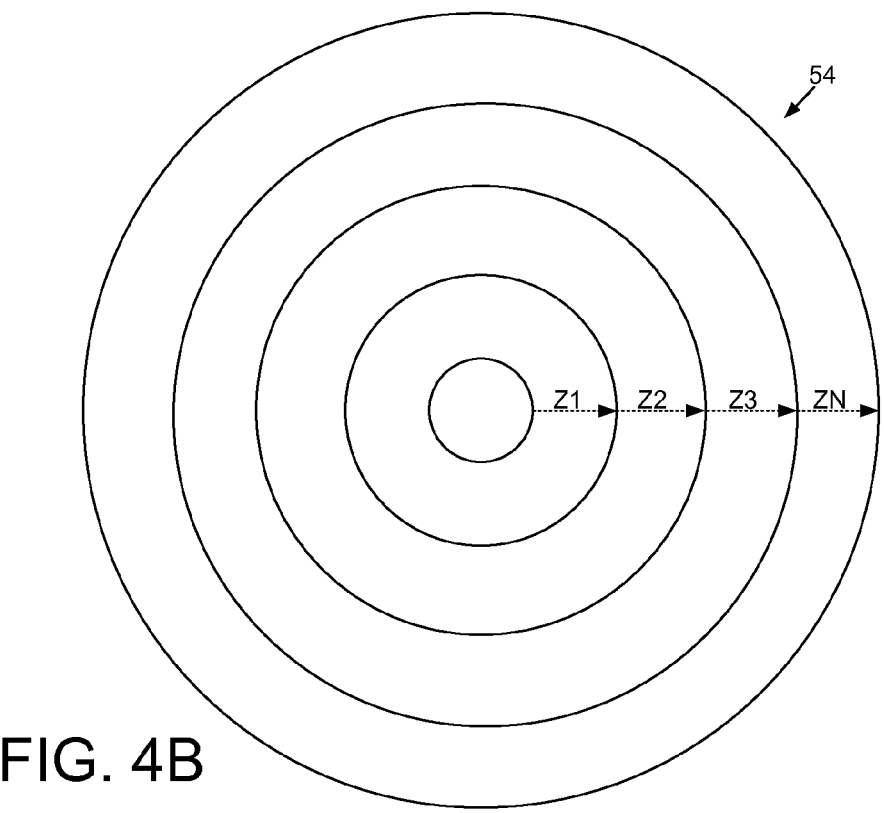
FIG. 4B shows an embodiment of the present invention wherein the disk of a disk drive is accessed in zoned blocks, wherein each zoned block comprises a plurality of contiguous data tracks.

The dynamic LBA to PBA mapping may be implemented using any suitable technique, such as shown in FIG. 4A where the disk 54 is accessed as a circular buffer. The data tracks are written from the ID toward the OD (or vice versa), and when the last data track is reached, the writing operation wraps around so as to overwrite the old data tracks at the tail of the circular buffer. In an alternative embodiment shown in FIG. 4B, the disk may be divided into a number of zoned blocks (Z1-ZN), wherein each zone comprises a plurality of contiguous data tracks. The zoned blocks are accessed similar to the blocks in the non-volatile semiconductor memory-based storage device described above with reference to FIG. 2A. That is, one of the zones is selected to service the current write commands, and when the current zone is filled, a new zone is selected from a pool of free zones. During a garbage collection operation, the valid data sectors of an old zone are copied to a new zone, and the control circuitry 56 maintains the first mapping to the data sector of the old zone as well as the second mapping to the data sector of the new zone. In one embodiment, the data sectors storing redundant data are eventually overwritten when the corresponding zone is selected to service new write commands. An old zone may or may not be erased prior to overwriting the data sectors. In either embodiment, the LBA mapping to the old data sector is invalidated when the data sector in the old zone is erased or overwritten, or when the same LBA is overwritten as part of a new write command.

The mapping of LBAs to PBAs may be implemented in any suitable manner in the embodiments of the present invention. FIG. 5A shows an embodiment wherein the control circuitry 6 of the data storage device 2 (FIG. 1A) maintains a LBA mapping table comprising a plurality of entries, wherein each entry maps an LBA to a primary PBA (PBA_1) and to a redundant PBA (PBA_2). The primary PBA stores newly written data for the LBA, and the redundant PBA stores a copy of the data when generated as part of the garbage collection operation. When an LBA does not have a corresponding redundant PBA, a NULL entry is assigned in the LBA mapping table. The LBA mapping table shown in FIG. 5A comprises an entry for each LBA; however, other embodiments may employ run-length encoding in order to reduce the size of the LBA mapping table.

FIG. 5B shows an alternative embodiment of the present invention wherein the control circuitry 6 maintains two mapping tables: a primary LBA mapping table for storing the LBA to PBA mapping for the most recent write operation, and a garbage collection LBA mapping table for storing the LBA to PBA mapping to the redundant memory segments generated as part of the garbage collection operation. When the LBA to PBA mapping to a redundant memory segment becomes invalid (due to an erase or overwrite), the corresponding entry in the garbage collection LBA mapping table is deleted. This embodiment may reduce the amount of memory needed to maintain the LBA mapping information since the garbage collection LBA mapping table may be significantly smaller than the primary LBA mapping table.

In one embodiment, the control circuitry 6 maintains the LBA mapping table(s) in a volatile semiconductor memory (e.g., a random access memory (RAM)) and updates the LBA mapping table(s) as new write commands are received by the host as well as when write commands are generated during the garbage collection operation. Periodically the control circuitry 6 writes (flushes) the updated LBA mapping table(s) to the non-volatile memory 4 so that the updates are saved when the data storage device is powered down. However, if the data storage device is subject to a power failure, the most recent updates to the LBA mapping table(s) that occur after the last flush operation will be lost. In one embodiment, the control circuitry 6 writes in-line mapping information to a memory segment of the non-volatile memory 4 when servicing each write command so that the in-line mapping information can be used to rebuild the LBA mapping table(s) when recovering from a power failure. FIG. 6A shows an embodiment of in-line mapping information written to the last page of the current block when servicing write commands in the non-volatile semiconductor memory-based storage device 26 of FIG. 2A, and FIG. 6B shows an embodiment of in-line mapping information written to the last data sector following a write command to the disk of the disk drive of FIG. 3A. The in-line mapping information comprises the LBAs of the write command so that when the data storage devices recovers from a power failure, the in-line mapping information can be read from the most recently written blocks of memory segments and used to rebuild the LBA mapping table(s). In one embodiment, the in-line mapping information comprises a flag (denoted by the example value [R] as shown) that indicates whether the LBA was written as part of a garbage collection operation so that the LBA mapping table(s) can be rebuilt with mapping to the primary PBA and the redundant PBA when appropriate.

Figure 7:
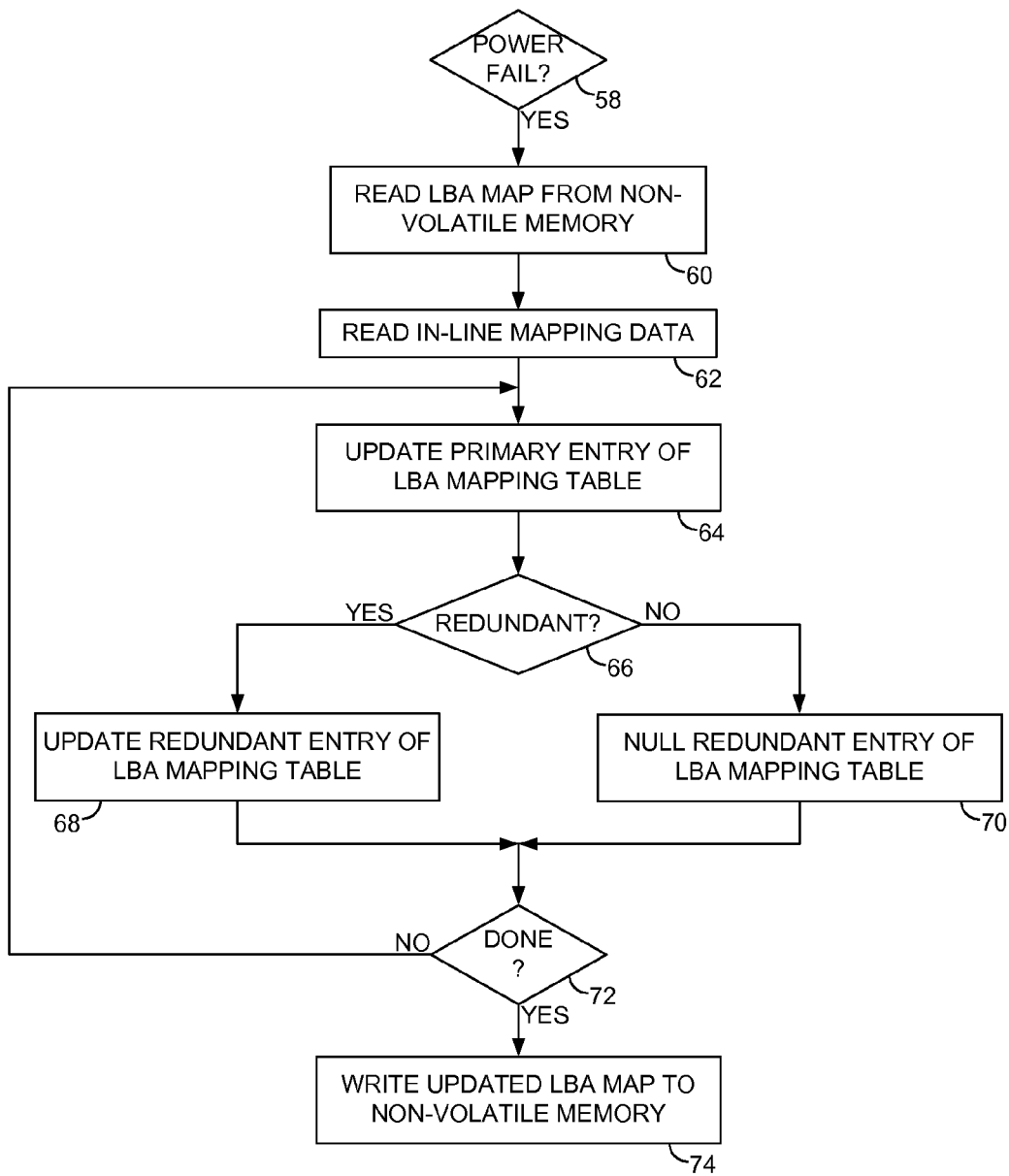
FIG. 7 is a flow diagram according to an embodiment of the present invention wherein after a power failure the in-line mapping information is used to rebuild the first and second mappings.

FIG. 7 is a flow diagram according to an embodiment of the present invention for rebuilding the LBA mapping table(s) when the data storage device recovers from a power failure. When the data storage device is powered on and a power fail condition is detected (block 58), the LBA mapping table(s) last flushed to the non-volatile memory 4 is read into a volatile semiconductor memory (e.g., RAM). The block(s) being written prior to the power failure operation are then accessed in order to recover the in-line mapping information (block 62). For each entry in the in-line mapping information, the primary entry of the LBA mapping table is updated (block 64), and if the in-line mapping information indicates a redundant memory segment, the redundant entry of the LBA mapping table is updated (block 68), otherwise the redundant entry of the LBA mapping table is nullified or deleted (block 70). The flow diagram is then repeated from block 64 until all of the in-line mapping information has been processed (block 72). The updated LBA mapping table(s) is then written to the non-volatile memory (block 74).

In one embodiment when executing the garbage collection operation the data in the valid memory segments are copied to a reserved area of the non-volatile memory, such as a pool of reserved blocks in the non-volatile semiconductor memory-based storage device 26 of FIG. 2A, or a pool of reserved zones on the disk of the disk drive of FIG. 3A. The data for new write commands received from the host are written to a different reserved area in the non-volatile memory. In this embodiment, in-line mapping information is written to both reserved areas, and when recovering from a power failure, the in-line information is recovered from both reserved areas. The in-line mapping information for the garbage collection area need not include a flag to indicate whether the LBA is a redundant copy since all LBAs in the garbage collection area are a redundant copy. In one embodiment, the in-line mapping information for both reserved areas includes a sequence number so that the order in which the garbage collection copy commands and the host write commands can be determined and used to accurately rebuild the LBA mapping table(s).

Figure 8:
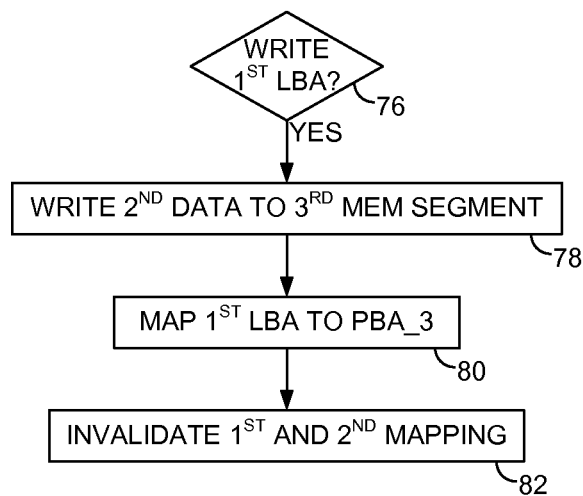
FIG. 8 is a flow diagram according to an embodiment of the present invention wherein when the first LBA is overwritten, the first and second mapping are invalidated.

FIG. 8 is a flow diagram according to an embodiment of the present invention which is an extension to the flow diagram of FIG. 1B. When a write command is received from the host to overwrite the first LBA with second data (block 76), the second data is written to a third memory segment (block 78), the LBA is mapped to a third PBA of the third memory segment (block 80), and the first and second mappings (generated at block 12 and block 18 of FIG. 1B) are invalidated (block 82). That is when an LBA is overwritten with new data, the previous LBA mappings (primary and redundant) are invalidated since they no longer correspond to the LBA (the primary and redundant memory segments become invalid).

Figure 9:
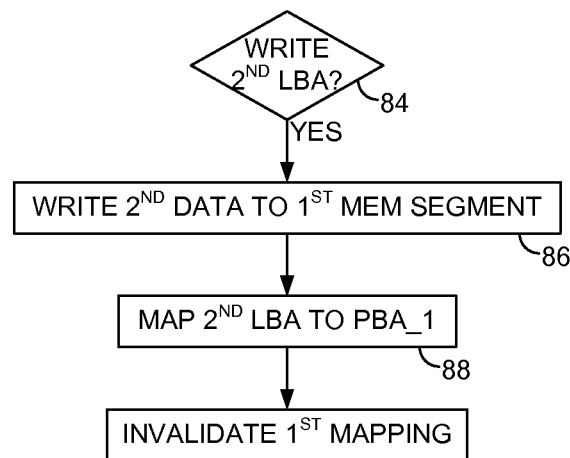
FIG. 9 is a flow diagram according to an embodiment of the present invention wherein when second data for a second LBA overwrites the first memory segment, the first mapping is invalidated.

FIG. 9 is a flow diagram according to an embodiment of the present invention which is an extension to the flow diagram of FIG. 1B. When a write command is received from the host to write second data to a second LBA (block 84), the second data may overwrite the first memory segment (block 86). That is, the first memory segment may be part of a free block selected to service the new write commands, and therefore the first memory segment is eventually overwritten. The second LBA is mapped to the first PBA of the first memory segment (block 88) and the first mapping (generated at block 12 of FIG. 1B) is invalidated. That is, the overwrite operation invalidates the redundant copy of the first LBA, but the primary copy for the first LBA (stored in the second memory segment) is still available.

Figure 10:
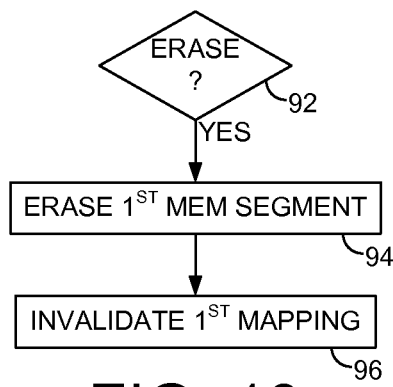
FIG. 10 is a flow diagram according to an embodiment of the present invention wherein when the first memory segment is erased, the first mapping is invalidated.

FIG. 10 is a flow diagram according to an embodiment of the present invention which is an extension to the flow diagram of FIG. 1B. In the embodiment wherein the garbage collection operation eventually erases the memory segments (block 92), the first memory segment is eventually erased (block 94) and the first mapping (generated at block 12 of FIG. 1B) is invalidated. That is, the erase operation invalidates the redundant copy of the first LBA, but the primary copy for the first LBA (stored in the second memory segment) is still available.

Figure 11:
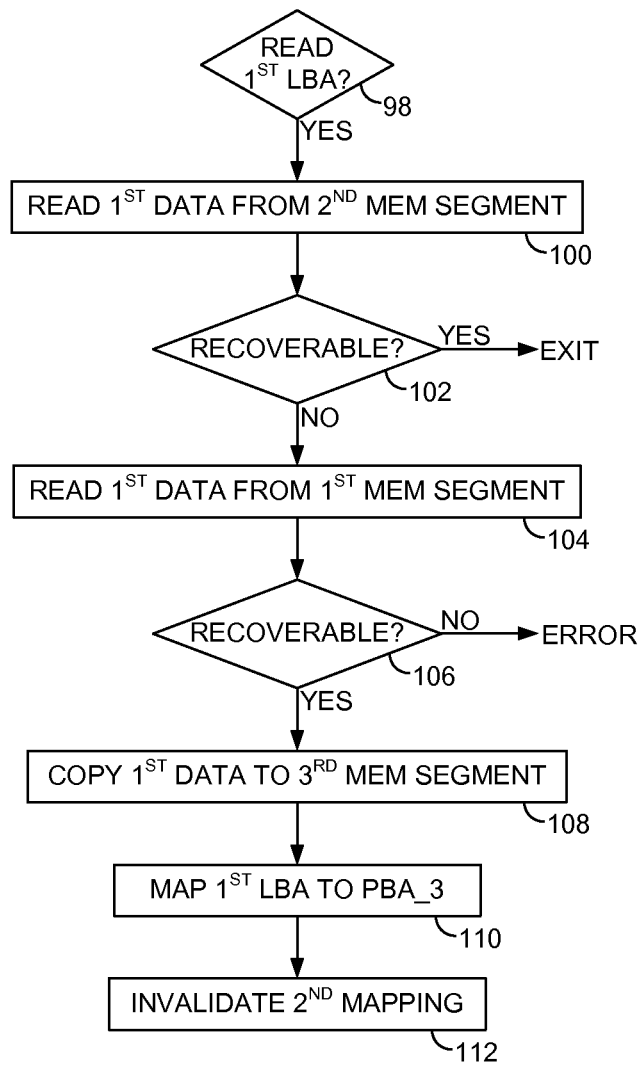
FIG. 11 is a flow diagram according to an embodiment of the present invention wherein when the first data cannot be recovered from the second memory segment, the first data is read from the first memory segment.

FIG. 11 is a flow diagram according to an embodiment of the present invention wherein the redundant copy of data stored in a garbage collected memory segment may be used to recover data when the primary copy of the data cannot be recovered (e.g., due to a defect). When a read command is received to read the first LBA (block 98), the control circuitry first attempts to read the first data from the second memory segment (block 100) which stores the primary copy. If the first data cannot be recovered from the second memory segment (block 102), the control circuitry attempts to read the first data from the first memory segment (block 104) which stores the redundant copy. In one embodiment if the first data is recoverable from the first memory segment (block 106), the first data is copied to a third memory segment (block 108) and the first LBA is mapped to a third PBA of the third memory segment (block 110). That is, the garbage collection operation is repeated for the first LBA so as to store another primary copy of the data in a different memory segment. The second mapping of the LBA to the second memory segment is invalidated (block 112) and in one embodiment the second memory segment may be mapped out as defective.

Figure 12:
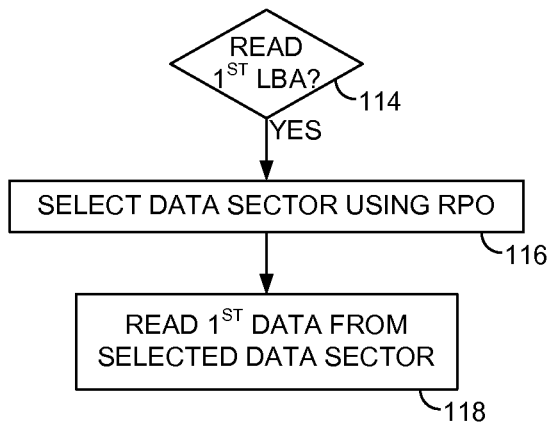
FIG. 12 is a flow diagram according to an embodiment of the present invention wherein when a read command is received to read the first LBA, an RPO algorithm is executed to select between the first and second memory segments.

FIG. 12 is a flow diagram according to an embodiment of the present invention wherein the data storage device comprises the disk drive shown in FIG. 3A. The control circuitry 56 queues a number of access commands received from the host, and then executes a rotational position optimization (RPO) algorithm in order to select and execute the access commands from the command queue in an order that minimizes the seek latency of the head 52 and the rotational latency of the disk 54 needed to access the corresponding memory segments (data sectors). Accordingly, when a read command is received from the host comprising the first LBA (FIG. 1B) that is mapped to first and second memory segments, the control circuitry selects between the first memory segment and the second memory segment using the RPO algorithm, and then reads the first data from the selected memory segment. In this embodiment, the redundant memory segments generated through the garbage collection operation improves performance of the RPO algorithm.

In a similar manner, in one embodiment, the availability of the redundant copy may be used to improve data transfer performance in the non-volatile semiconductor memory-based storage device 26 of FIG. 2A. The redundant copy may enable the controller 28 to exploit the parallelism in data channels employing multiple memory devices 30. In one embodiment, a first memory device 30 comprises a first memory array 46 accessed over a first channel, and a second memory device 30 comprises a second memory array 46 accessed over a second channel. When servicing a read command for a particular LBA, if the primary copy resides in a memory array that is serviced by a busy channel with a long queue of requests, the controller may choose to access the redundant copy if it resides in a different memory array serviced by a less busy channel. In addition, if the primary and redundant copies are accessible through different channels, the controller 28 may also choose to obtain a part of the data from the primary copy and a part of the data from the redundant copy and combine the parts to effectively increase the overall transfer rate.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on.

In yet another embodiment, the control circuitry comprises suitable logic circuitry, such as state machine circuitry.

What is claimed is:

1. A data storage device comprising:
   a non-volatile memory comprising a plurality of memory segments; and
   control circuitry operable to:
      receive a first write command from a host comprising first data and a first logical block address (LBA);
      write the first data to a first memory segment and first map the first LBA to a first physical block address (PBA) of the first memory segment;
      during a garbage collection operation, copy the first data from the first memory segment to a second memory segment and second map the first LBA to a second PBA of the second memory segment;
      after the garbage collection operation, receive a read command from the host comprising the first LBA;
      in response to the read command:
         select between the first memory segment and the second memory segment; and
         read at least part of the first data from the selected memory segment,
      write in-line mapping information to a third memory segment, wherein the in-line mapping information comprises an identifier for identifying the first LBA as being written as part of the garbage collection operation; and
      execute a recovery procedure after a power failure by rebuilding the first and second mapping in response to the in-line mapping information, including the identifier.

2. The data storage device as recited in claim 1, wherein the control circuitry is further operable to:
   receive a second write command from the host comprising second data and the first LBA; and
   write the second data to a third memory segment, third map the first LBA to a third PBA of the third memory segment, and invalidate the first and second mapping.

3. The data storage device as recited in claim 1, wherein the control circuitry is further operable to:
   receive a second write command from the host comprising second data and a second LBA; and
   write the second data to the first memory segment, third map the second LBA to the first PBA, and invalidate the first mapping.

4. The data storage device as recited in claim 1, wherein after the garbage collection operation the control circuitry is further operable to erase the first memory segment and invalidate the first mapping.

5. The data storage device as recited in claim 1, wherein the control circuitry is further operable to:
   store the first mapping in a garbage collection LBA mapping table;
   store the second mapping in a primary LBA mapping table; and
   write the garbage collection LBA mapping table and the primary LBA mapping table to the non-volatile memory.

6. The data storage device as recited in claim 1, further comprising:
   a first semiconductor memory array comprising the first memory segment;
   a first channel operable to access the first semiconductor memory array;
   a second semiconductor memory array comprising the second memory segment; and
   a second channel operable to access the second semiconductor memory array;
   wherein the selection between the first memory segment and the second memory segment is based on an availability of the first and second channels.

7. The data storage device as recited in claim 6, wherein:
   each of the first and second semiconductor memory arrays comprises a plurality of blocks;
   each block comprises a plurality of pages; and
   each memory segment corresponds to at least part of a page.

8. The data storage device as recited in claim 7, wherein the control circuitry is further operable to read at least a part of the first data from the non-selected memory segment in addition to reading at least a part of the first data from the selected memory segment.

9. The data storage device as recited in claim 1, wherein:
   the non-volatile memory comprises a disk;
   the disk comprises a plurality of tracks;
   each track comprises a plurality of data sectors; and
   each memory segment corresponds to one of the data sectors.

10. The data storage device as recited in claim 9, wherein the selection between the first memory segment and the second memory segment is based on a rotational position optimization (RPO) algorithm.

11. A method of operating a data storage device, the data storage device comprising a non-volatile memory comprising a plurality of memory segments, the method comprising:
    receiving a first write command from a host comprising first data and a first logical block address (LBA);
    writing the first data to a first memory segment and first map the first LBA to a first physical block address (PBA) of the first memory segment;
    during a garbage collection operation, copying the first data from the first memory segment to a second memory segment and second map the first LBA to a second PBA of the second memory segment;
    after the garbage collection operation, receiving a read command from the host comprising the first LBA;
    in response to the read command:
       selecting between the first memory segment and the second memory segment; and
       reading at least part of the first data from the selected memory segment
       writing in-line mapping information to a third memory segment, wherein the in-line mapping information comprises an identifier for identifying the first LBA as being written as part of the garbage collection operation; and
    executing a recovery procedure after a power failure by rebuilding the first and second mapping in response to the in-line mapping information, including the identifier.

12. The method as recited in claim 11, further comprising:
    receiving a second write command from the host comprising second data and the first LBA; and
    writing the second data to a third memory segment, third mapping the first LBA to a third PBA of the third memory segment, and invalidating the first and second mapping.

13. The method as recited in claim 11, further comprising:
    receiving a second write command from the host comprising second data and a second LBA; and
    writing the second data to the first memory segment, third mapping the second LBA to the first PBA, and invalidating the first mapping.

14. The method as recited in claim 11, wherein after the garbage collection operation further comprising erasing the first memory segment and invalidating the first mapping.

15. The method as recited in claim 11, further comprising:
   storing the first mapping in a garbage collection LBA mapping table;
   storing the second mapping in a primary LBA mapping table; and
   writing the garbage collection LBA mapping table and the primary LBA mapping table to the non-volatile memory.

16. The method as recited in claim 11, wherein the data storage device further comprises:
   a first semiconductor memory array comprising the first memory segment;
   a first channel operable to access the first semiconductor memory array;
   a second semiconductor memory array comprising the second memory segment; and
   a second channel operable to access the second semiconductor memory array;
   wherein the selection between the first memory segment and the second memory segment is based on an availability of the first and second channels.

17. The method as recited in claim 16, wherein:
   each of the first and second semiconductor memory arrays comprises a plurality of blocks;
   each block comprises a plurality of pages; and
   each memory segment corresponds to at least part of a page.

18. The method as recited in claim 17, further comprising reading at least a part of the first data from the non-selected memory segment in addition to reading at least a part of the first data from the selected memory segment.

19. The method as recited in claim 11, wherein:
   the non-volatile memory comprises a disk;
   the disk comprises a plurality of tracks;
   each track comprises a plurality of data sectors; and
   each memory segment corresponds to one of the data sectors.

20. The method as recited in claim 19, wherein the selection between the first memory segment and the second memory segment is based on a rotational position optimization (RPO) algorithm.

21. A data storage device comprising:
   a non-volatile memory comprising a plurality of memory segments; and
   control circuitry operable to:
      receive a first write command from a host comprising first data and a first logical block address (LBA);
      write the first data to a first memory segment and first map the first LBA to a first physical block address (PBA) of the first memory segment;
      during a garbage collection operation, copy the first data from the first memory segment to a second memory segment and second map the first LBA to a second PBA of the second memory segment;
      after the garbage collection operation, receive a read command from the host comprising the first LBA;
      in response to the read command:
         select between the first memory segment and the second memory segment; and
         read at least part of the first data from the selected memory segment,
      store the first mapping in a garbage collection LBA mapping table;
      store the second mapping in a primary LBA mapping table; and
      write the garbage collection LBA mapping table and the primary LBA mapping table to the non-volatile memory.

22. A method of operating a data storage device, the method comprising:
   receiving a first write command from a host comprising first data and a first logical block address (LBA);
   writing the first data to a first memory segment of a non-volatile memory and first mapping the first LBA to a first physical block address (PBA) of the first memory segment;
   during a garbage collection operation, copying the first data from the first memory segment to a second memory segment and second mapping the first LBA to a second PBA of the second memory segment;
   after the garbage collection operation, receiving a read command from the host comprising the first LBA;
   in response to the read command:
      selecting between the first memory segment and the second memory segment; and
      reading at least part of the first data from the selected memory segment, storing the first mapping in a garbage collection LBA mapping table;
   storing the second mapping in a primary LBA mapping table; and
   writing the garbage collection LBA mapping table and the primary LBA mapping table to the non-volatile memory.

\* \* \* \* \*